US007729201B2

(12) United States Patent
Wildey

(10) Patent No.: US 7,729,201 B2
(45) Date of Patent: Jun. 1, 2010

(54) METHOD AND APPARATUS FOR SPREAD SPECTRUM DISTANCE AND VELOCITY PROFILE MEASUREMENT

(76) Inventor: Chester Wildey, 3621 Smoke Tree Trail, Euless, TX (US) 76040

( * ) Notice: Subject to any disclaimer, the term of this patent is extended or adjusted under 35 U.S.C. 154(b) by 240 days.

(21) Appl. No.: 11/726,186

(22) Filed: Mar. 21, 2007

(65) Prior Publication Data
US 2007/0165488 A1 Jul. 19, 2007

Related U.S. Application Data

(63) Continuation-in-part of application No. 10/396,907, filed on Mar. 25, 2003, now abandoned.

(51) Int. Cl.
*G01S 15/00* (2006.01)
(52) U.S. Cl. .................... 367/40; 367/101
(58) Field of Classification Search ............ 367/40, 367/101, 908; 342/124
See application file for complete search history.

(56) References Cited

U.S. PATENT DOCUMENTS

| 4,890,266 A | 12/1989 | Woodward |
| 5,335,545 A | 8/1994 | Leszczynski |
| 5,418,758 A | 5/1995 | Webster |
| 5,731,782 A | 3/1998 | Walls |
| 5,764,686 A | 6/1998 | Sanderford et al. |
| 6,176,830 B1 | 1/2001 | Freiburger |
| 7,035,398 B2 * | 4/2006 | Matsuo .................. 379/406.06 |
| 2003/0185101 A1 | 10/2003 | Wildey |

OTHER PUBLICATIONS

Xiong et al., "Spectrally Shaped Generalized Mc-DS-CDMA with Dual Band Combining for Increased Diversity", This paper appears in: Wireless Communications, IEEE Transactions on Publication Date: May 2008, vol. 7, Issue: 5, Part 1, pp. 1676-1686, ISSN: 1536-1276, INSPEC Accession No. 9995918.*

* cited by examiner

*Primary Examiner*—Ian J Lobo
(74) *Attorney, Agent, or Firm*—Schultz & Associates, P.C.

(57) ABSTRACT

A method and apparatus for spread spectrum distance and for spread spectrum velocity profile measurement is provided where the short pulse of traditional ultrasonic and radar level gauges is replaced by low peak power direct sequence spread spectrum (DSSS) modulated energy. An echo sequence subtraction process is provided that increases the signal to noise ratio of each echo sequence thus increasing the dynamic range of the system. In addition to providing a higher signal to noise ratio (SNR), better precision and accuracy in ranging Doppler applications and the ability to use lower peak power transmissions, the system is more immune to interference from the environment and allows for less expensive and less bulky ultrasonic transducers.

8 Claims, 13 Drawing Sheets

FIG. 6

| | 1 | 2 | 3 | 4 | 5 | 6 | 7 | 8 | 9 | 10 | 11 | 12 | |
|---|---|---|---|---|---|---|---|---|---|---|---|---|---|
| BIT POSITION (602) | 1 | 2 | 3 | 4 | 5 | 6 | 7 | 8 | 9 | 10 | 11 | 12 | |
| TRANSMITTED SEQUENCE (604) | 1 | 1 | 0 | 0 | 1 | 1 | 1 | 0 | 1 | 0 | 0 | 1 | |
| RECEIVED SEQUENCE | 1 | 6 | 4 | 10 | 4 | 0 | 11 | 7 | 3 | 2 | 3 | 1 | |
| CROSS CORRELATION FUNCTION USES: | | | | | | | | | | | | | |
| NORMALIZED TRANSMITTED SEQUENCE (606) | 1 | 1 | -1 | -1 | 1 | 1 | 1 | -1 | 1 | -1 | -1 | 1 | |
| TRUNCATED RECEIVED SEQUENCE (608) | 1 | 6 | 4 | 10 | 4 | 0 | 11 | 7 | | | | | |
| FIRST RESULT (620) | 1 | 6 | -4 | -10 | 4 | 0 | 11 | -7 | | | | | FIRST CORRELATION VALUE=1 (630) |
| NORMALIZED TRANSMITTED SEQUENCE W/PHASE SHIFT (610) | 1 | -1 | -1 | 1 | 1 | 1 | -1 | 1 | -1 | -1 | 1 | ▼ | |
| TRUNCATED RECEIVED SEQUENCE (608) | 1 | 6 | 4 | 10 | 4 | 0 | 11 | 7 | | | | | |
| SECOND RESULT (622) | 1 | -6 | -4 | 10 | 4 | 0 | -11 | 7 | | | | | SECOND CORRELATION VALUE=1 (632) |
| NORMALIZED TRANSMITTED SEQUENCE W/2 PHASE SHIFTS (612) | -1 | -1 | 1 | 1 | 1 | -1 | 1 | -1 | -1 | 1 | ▼ | ▼ | |
| TRUNCATED RECEIVED SEQUENCE (608) | 1 | 6 | 4 | 10 | 4 | 0 | 11 | 7 | | | | | |
| THIRD RESULT (624) | -1 | -6 | 4 | 10 | 4 | 0 | 11 | -7 | | | | | THIRD CORRELATION VALUE=15 (634) |

```
% Listing for the MATLAB simulation.
% The percent sign (%) indicates the start of a comments section.
% Parameters:
dsL=20 % 1024*dsL = length of direct sequence .. 10*log10(1024*dsL) = processing gain.
AL=100  % AL is the length of the echo profile, AL<1024 for uniqueness in this simulation.
```
*1302*

```
% First generate the maximal length direct sequence, in this case a 1024 bit sequence, using the shift
% register model
dsref10b=zeros(1024,1);

% Arbitrary seed:

F1=0
F2=1
F3=0
F4=1
F5=0
F6=0
F7=0
F8=1
F9=1
F10=0

% Generate maximal length direct sequence for i = 1:1024;
   dsref10b(i)=F10;
   F10=F9;
   F9=F8;
   F8=F7;
   F7=F6;
   F6=F5;
   F5=F4;
   F4=F3;
   F3=F2;
   F2=F1;

F1=xor(dsref10b(i),F4);
end
```
*1304*

```
% Normalize to -1,1
for i = 1:1024;
   dsref10b(i)=(dsref10b(i)-.5)*2;
end
```
*1306*

```
% Generate sequence to be used, based on the 1024 bit sequence repeated dsL times.
ds=zeros(1024*dsL,1);

for i = 1:dsL;
  for j = 1:1024;
    ds((i-1)*1024+j)=dsref10b(j);
  end
end
```
*1308*

*FIG. 13A*

```
% Now build received signal
% A gives amplitude profile of the echo

A=zeros(AL,1);

% This gives an exponential decay with 80 dB dynamic range.

for i = 1:100;
    A(i)=100000*exp(-i/8.685889);
end
```
⎫ 1310

```
% Add an echo to the middle of the echo profile for i = 1:10;
    A(i+40)=A(i+40)+5000;
end
```
⎫ 1312

```
% Make received sequence rx based on sequence ds and echo amplitude and phase shift profile A.

rx=zeros(1024*dsL,1);

for i = 1:1024*dsL-AL;
    for j = 1:AL;
        rx(i)=rx(i)+A(j)*ds(i+j);
    end
end
```
⎫ 1314

```
% Create noise and add to received sequence rx noise=wgn(1024*dsL,1,0);
rx=rx+50000*noise;
```
⎫ 1316

```
% Now decode received signal rx decoderx=zeros(AL,1);
```
⎫ 1318

```
% Detect, record, and then remove signals from the rx sequence so as to extend dynamic range over
% the standard dsss cross-correlation method.

for i = 1:AL;
    rec=0;
    for j = 1:1024*dsL-AL;
        rec=rec+rx(j)*ds(i+j);
    end
    decoderx(i)=rec; % signal is detected here
    for k=1:1024*dsL-AL;
        rx(k)=rx(k)-(rec/(1024*dsL-AL))*ds(k+i); % detected signal is removed from rx here.
    end
end
```
⎫ 1320

⎫ 1322

1328   1324   1326

```
% Note - echoes should be detected and removed in highest to lowest amplitude order. This is not strictly
% followed in this example in order to simplify the code for easier comprehension of the technique. The
% result is a poorer SNR in on the echo profile immediately before the 10 dB echo beginning at A(70).

plot(decoderx)
plot(rx)
```

*FIG. 13B*

% Listing for the MATLAB simulation for a direct sequence ranging Doppler measurement system.
% The percent sign (%) indicates the start of a comments section.
%Parameters:

dsL=20 % 1024*dsL = length of direct sequence .. 10*log10(1024*L) = processing gain.
AL=100 % AL is the length of the echo profile, AL<1024 for uniqueness in this simulation.  } 1402

% First generate the maximal length direct sequence, in this case a 1024 bit sequence, using the
% shift register model
dsref10=zeros(1024,1);
%arbitrary seed:
F1=0
F2=1
F3=0
F4=1
F5=0
F6=0
F7=0
F8=1
F9=1
F10=0
% Generate maximal length sequence
for i = 1:1024;
    dsref10(i)=F10;
    F10=F9;
    F9=F8;
    F8=F7;
    F7=F6;
    F6=F5;
    F5=F4;
    F4=F3;
    F3=F2;
    F2=F1;

F1=xor(dsref10(i),F4);
end

% Normalize to -1,1
for i = 1:1024;
    dsref10(i)=(dsref10(i)-.5)*2;
end

% Create prototype signals for each possible Doppler shift.
% In this example, this is limited to 5 possible Doppler shifts.
dsref10b=zeros(5120,1);
for i = 1:1024;
    dsref10b(i)=dsref10(i);
    dsref10b(i+(1)*1024)=dsref10(i);
    dsref10b(i+(2)*1024)=dsref10(i);
    dsref10b(i+(3)*1024)=dsref10(i);
    dsref10b(i+(4)*1024)=dsref10(i);
end

*FIG. 14A*

```
% Generate sequence of length 5120 for each allowed Doppler shift. In this example, simulation only
% shows 5 possible Doppler shifts.
dsreflong5=zeros(5120,1); % This is the lowest frequency in this simulation.
for i = 1:1024;
   dsreflong5((i-1)*5+1)=dsref10b(i);
   dsreflong5((i-1)*5+2)=dsref10b(i);
   dsreflong5((i-1)*5+3)=dsref10b(i);
   dsreflong5((i-1)*5+4)=dsref10b(i);
   dsreflong5((i-1)*5+5)=dsref10b(i);
end
 dsreflong4=zeros(5120,1);
for i = 1:1280;
   dsreflong4((i-1)*4+1)=dsref10b(i);
   dsreflong4((i-1)*4+2)=dsref10b(i);
   dsreflong4((i-1)*4+3)=dsref10b(i);
   dsreflong4((i-1)*4+4)=dsref10b(i);
end
 dsreflong3=zeros(5120,1);
for i = 1:1706;
   dsreflong3((i-1)*3+1)=dsref10b(i);
   dsreflong3((i-1)*3+2)=dsref10b(i);
   dsreflong3((i-1)*3+3)=dsref10b(i);
end
 dsreflong2=zeros(5120,1);
for i = 1:2560;
   dsreflong2((i-1)*2+1)=dsref10b(i);
   dsreflong2((i-1)*2+2)=dsref10b(i);
end
 dsreflong1=zeros(5120,1); % This is the highest frequency in this simulation.
for i = 1:5120;
   dsreflong1(i)=dsref10b(i);
end
```
⎫
⎬ 1410
⎭

```
% ds1 to ds5 hold the hold the sequences that make the echoes at the five Doppler shifts.
ds5=zeros(5120*dsL,1);
ds4=zeros(5120*dsL,1);
ds3=zeros(5120*dsL,1);
ds2=zeros(5120*dsL,1);
ds1=zeros(5120*dsL,1);
for i = 1:dsL;
   for j = 1:5120;
      ds5((i-1)*5120+j)=dsreflong5(j);
      ds4((i-1)*5120+j)=dsreflong4(j);
      ds3((i-1)*5120+j)=dsreflong3(j);
      ds2((i-1)*5120+j)=dsreflong2(j);
      ds1((i-1)*5120+j)=dsreflong1(j);
   end
end
```
⎫
⎬ 1412
⎭

*FIG. 14B*

```
% Now build received signal

% A1 to A3 give amplitudes of the echoes 1 to 3. For this example there will be three echoes
% at three different Doppler shifts.

% Set amplitudes to 10, 5 and 3 for A1, A2, A3 respectively.

A1=10;
A2=5;
A3=3;

% A1 will be at range 20, A2 will be at range 30, and A3 will be at range 70.

R1=20;
R2=30;
R3=70;

% A1 will be Doppler shifted x1, A2 will be Doppler shifted x3, A3 will be Doppler shifted x5.

% Make simulated received sequence rx. This is what you would receive from the environment
% in response to a transmitted sequence in a real application. The transmitted sequence would
% correspond to sequence dsref10 in this example.

rx=zeros(5120*dsL,1);

% Now to assemble the simulated received signal.
for i = 1:5120*dsL-AL;
    rx(i)=rx(i)+A1*ds1(i+R1);
    rx(i)=rx(i)+A2*ds3(i+R2);
    rx(i)=rx(i)+A3*ds5(i+R3);
end % Create noise and add to received sequence rx to simulate the noise that occurs in a
% real-world application.

noise=randn(5120*dsL,1);
rx=rx+100*noise;

% Decode received signal rx into decoderx showing the range for the five selected Doppler.

decoderx=zeros(AL,5,1);
resultsrx=zeros(AL,5,1);

% Detect, record, and then remove signals from the rx sequence.
for i = 1:AL;
    rec1=0;
    rec2=0;
    rec3=0;
    rec4=0;
    rec5=0;
    for j = 1:5120*dsL-AL;
        rec1=rec1+rx(j)*ds1(i+j);
        rec2=rec2+rx(j)*ds2(i+j);
        rec3=rec3+rx(j)*ds3(i+j);
        rec4=rec4+rx(j)*ds4(i+j);
        rec5=rec5+rx(j)*ds5(i+j);
    end
```

*FIG. 14C*

```
     decoderx(i,1)=rec1;
     decoderx(i,2)=rec2;
     decoderx(i,3)=rec3;
     decoderx(i,4)=rec4;
     decoderx(i,5)=rec5;
end
```
⎱ 1422

% Now remove the largest amplitude echo from the rx database and reprocess.
% In this simulation this was echo with Doppler shift of 1x.

```
for k=1:5120*dsL-AL;
   rx(k)=rx(k)-10.084*ds1(k+R1)
```

% The 10.084 is the estimation for A1 from the first analysis. The exact A1=10 is not
% recovered due to noise.
end

⎱ 1424

% Store the data from the largest recovered echo into the results database. Since the
% largest echo was at Doppler shift 1, that echo goes into the resultsrx vector before
% subtraction from the rx database.

```
for i = 1:AL;
   resultsrx(i,1)=decoderx(i,1);
end
```

⎱ 1426

% Reprocess with the first echo removed;

```
for i = 1:AL;
   rec1=0;
   rec2=0;
   rec3=0;
   rec4=0;
   rec5=0;

for j = 1:5120*dsL-AL;
      rec1=rec1+rx(j)*ds1(i+j);
      rec2=rec2+rx(j)*ds2(i+j);
      rec3=rec3+rx(j)*ds3(i+j);
      rec4=rec4+rx(j)*ds4(i+j);
      rec5=rec5+rx(j)*ds5(i+j);
   end decoderx(i,1)=rec1;
   decoderx(i,2)=rec2;
   decoderx(i,3)=rec3;
   decoderx(i,4)=rec4;
   decoderx(i,5)=rec5;
end
```

⎱ 1428

% Note - echoes should be detected and removed in highest to lowest amplitude order for best
% SNR in the finished profile.

*FIG. 14D*

METHOD AND APPARATUS FOR SPREAD SPECTRUM DISTANCE AND VELOCITY PROFILE MEASUREMENT

This application is a Continuation-In-Part claiming priority benefit from U.S. patent application Ser. No. 10/396,907 which was filed on Mar. 25, 2003 now abandoned.

FIELD OF THE INVENTION

This invention relates to instrumentation for measurement of levels of materials in tanks and other situations and the flow rates of moving fluids. In particular, this invention relates to an apparatus and method for using direct sequence spread spectrum modulation in a pulsed time of flight ranging system for measurement of levels and Doppler flow profiling system to determine the flow rate of moving fluids.

BACKGROUND OF THE INVENTION

Ultrasonic measurement is commonly used in industrial bulk material level measurements and flow control. The bulk material may be in granular, powder or liquid form and is stored in tanks and moved through pipes or conduits during various processes.

One of the most common technologies in ultrasonic measurement is "monopulse time of flight reflectometry" ("MTFR") as disclosed in U.S. Pat. No. 4,890,266 to Woodward. Woodward discusses a system that produces a burst of ultrasound energy that is transmitted toward the surface of a material in a tank. The return echo is analyzed to provide information as to the distance to any reflecting targets. One drawback of the technique of Woodward is that the receiver required is so sensitive that it becomes saturated and insensitive to reflected energy immediately after transmission of the ultrasound burst. The result is that the receiver has a blind area extending 10 to 100 cm (or sometimes more depending on the particular device characteristics) along the axis of transmission. The sensor will not provide level measurement in this blind area. As a result of this limitation, the upper volume of the tanks is unavailable for use because the level of material in the tanks cannot be measured. Therefore, the practical storage volume of the tank is reduced by the inability of the receiver to measure the top of the tank. Another drawback is that since the time duration of the transmit pulse is short, and since the path losses for the return echo are usually large, the transmit pulse must be of high amplitude. A high amplitude pulse can only be generated by high power transmitter and amplifier which are relatively expensive.

Other methods are used in the prior art for measuring levels in tanks, including the use of radar frequency energy systems. The use of radar energy systems suffers from the same drawbacks as ultrasound systems. However, for radar frequency systems, an additional problem of timing arises. Since the speed of propagation for electromagnetic energy is much higher than for sound waves, it becomes difficult to capture reflected energy with sufficient precision to determine distances accurately. As a result, many radar frequency energy systems may not be used to determine the level in a tank due to the short distances involved. Another problem is that radar frequency systems are usually limited to conductive (i.e., metal) tanks. The reason is that leakage of radar energy from non-conductive tanks often exceeds allowable free space emissions for such energy. Still another problem with radar frequency energy systems is measuring levels of materials with low dielectric constants because they return only a very small echo. A small echo exacerbates the problems of requiring an initial high pulse energy and high system cost.

Another known ranging technique is "Time Domain Reflectometry" (TDR). In this technique a transmission line is placed in the tank and makes contact with the material to be measured. An electronic pulse is sent through the transmission line. The level of the material creates a slight impedance change in the transmission line thus reflecting a portion of the transmitted pulse. This technique suffers from problems in detecting materials with low dielectric constants. Many times materials with low dielectric constants do not reflect sufficient energy to be measurable, thus making the technique ineffective.

Other systems are known for measuring moving fluids in a pipe or conduit. These systems are known as Doppler flow meters. In a Doppler flow meter, a pulse of ultrasound energy is transmitted into a moving liquid medium. A portion of the pulse is reflected from suspended particles or bubbles in the moving fluid and picked up by a receiver. The receiver may be "range gated" in that it samples only a narrow time segment of the entire reflected energy, corresponding to a desired target range. The distance to and relative velocity of the suspended particles can be calculated from the Doppler shift of the reflected energy along with the range gate delay timing. By making a series of these measurements with different range gate timing delays, a profile of the liquid velocity may be generated. The profile, along with the depth of the liquid and the known cross sectional area of the flow conduit can be used to calculate the flow rate of the fluid. The flow rate is typically integrated over time to give the total volume of flow for some period of time. The major limitation of this type of system is that the range gate has a limited width in time, thus limiting the precision to which the returned frequency may be determined, and thus severely limiting the accuracy with which the flow may be calculated.

It is then a goal of the present invention to provide a direct sequence spread spectrum distance and velocity measurement system that increases dynamic range and reduces peak transmitted power.

It is another goal of the present invention to provide a direct sequence spread spectrum distance and velocity measurement system that minimizes the "blind area" and allows a more complete use of storage tank capacity.

It is another goal of the present invention to provide a direct sequence spread spectrum distance and velocity measurement system that will reduce radar energy escaping into the environment and can be applied in a non-conducting tank.

It is another goal of the present invention to provide a direct sequence spread spectrum distance and velocity measurement system that offers processing gain by reducing direct sequence spread spectrum side lobe interference through echo subtraction allowing detection and measurement of small echoes associated with low dielectric constant materials.

It is another goal of the present invention to provide a direct sequence spread spectrum distance and velocity measurement system that increases the precision of the Doppler based measurements by eliminating the limited time window of traditional systems by continuously examining the Doppler shifts at a given range from the sensor.

SUMMARY OF INVENTION

A method and apparatus is provided for improving the dynamic range and the accuracy of pulsed time of fight ranging and Doppler flow meters by using direct sequence spread spectrum modulation and a correlation function to identify and remove multiple correlation peaks. The short high energy pulse of prior art ultrasonic and radar level gauges is replaced by direct sequence spread spectrum (DSSS) modulated energy providing a low peak power, high dynamic range measurement system for industrial instrumentation. A novel echo subtraction technique is utilized to provide improved signal to noise ratio (SNR) and accuracy in ranging Doppler applications. Additionally, DSSS measurements are employed using multiple frequencies and are therefore more immune to interference from the environment such as frequency dependent attenuation and frequency specific noise. Energy can be transmitted at a lower level than pulsed systems leading to a more efficient operation important for low powered instruments such as those operated from battery power and also leading to less expensive and less bulky ultrasonic transducers.

Generally, a signal processor is provided which generates a chip sequence with properties determined by the size of the tank and the level of precision desired. The processor sends the signal to a modulator that passes the signal through an amplifier and on to a transmit transducer. The transmit transducer transmits the modulated energy into the tank to be measured. The transmitted energy may be sound or radar energy. The transmitted energy is reflected from targets in the tank and received by a receive transducer. The received sequence will consist of several versions of the original sequence each phase shifted according to the echo delay and each reduced in amplitude by the echo amplitude. Both the transmitted energy and the received sequence are filtered through the transmitting transducer, receiving transducer, and transmission medium. A high dynamic range echo profile is recovered by recording the received sequence and cross correlating it with a number of phase delayed versions of the original sequence.

In signal processing, cross correlation is a measure of the similarity of two signals. It is a function of the relative time between the two signals. The more the signals match, the higher the correlation value. The processor identifies the largest correlation point and replicates the corresponding largest echo sequence and its associated interferences to other sequences (also known as side lobes) using the identified phase delay and amplitude from the correlation output. Once the corresponding largest echo sequence is identified, it is subtracted from the recorded signal. When the largest echo sequence is removed, the signal to noise ratio of the next largest echo sequence is increased.

The process is repeated by removing the next largest echo sequence from the recorded signal and so on. A high dynamic range echo profile is created by cataloging the removed echo sequences. The ultimate limit of the process is the ambient noise and the processing gain of the selected sequence. Because each removed echo sequence has a higher signal to noise ratio than it did before the preceding echo sequence was removed, the resulting measurement echo profile has a higher dynamic range than the original received sequence. The echo profile is then analyzed to extract "range to target" information.

In ultrasonic flow meter applications, a frequency shifting function in the phase delayed chip sequence is added during processing. The frequency shifting function is implemented by "stretching" the reference sequence to simulate a Doppler shift. By adjusting the frequency shift and phase delay of the reference sequence in a nested loop manner, both range and Doppler shift may be determined. The echo identification and sequence removal then proceed as for the range only instrument described above. A three dimensional echo profile is generated, with correlation amplitude plotted against both echo delay and frequency shift. The echo profile is then analyzed to extract target range and velocity information.

BRIEF DESCRIPTION OF THE DRAWINGS

In the detailed description of the preferred embodiments presented below, reference is made to the accompanying drawings.

FIG. 6 is a chart depicting an example of correlation value calculation used in one embodiment of the invention.

FIGS. 13a and 13b are examples of the computer code used to perform the echo subtraction process in a direct sequence spread spectrum ranging system.

FIGS. 14a, 14b, 14c and 14d are examples of the computer code used to perform the echo subtraction process in a ranging Doppler flow measurement system.

DETAILED DESCRIPTION OF THE PREFERRED EMBODIMENT

In the descriptions that follow, like parts are marked throughout the specification and drawings with the same numerals, respectively. The drawings are not necessarily drawn to scale and certain figures may be shown in exaggerated or generalized form in the interest of clarity and conciseness.

Figure 1:
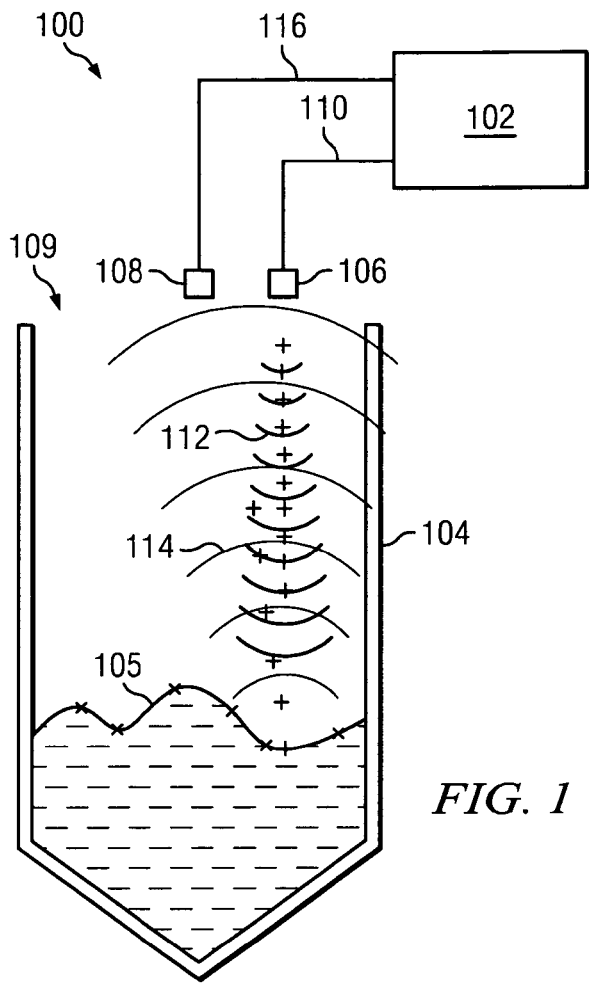
FIG. 1 is schematic of the components of a direct sequence spread spectrum ranging system.

FIG. 1 shows a schematic diagram of a direct sequence spread spectrum ranging system for measuring level of material surface 105 in tank 104. Pulse echo ranging system 100 is comprised of transmit transducer 106 connected to signal processor 102 by transmission line 110. Receive transducer 108 is connected to signal processor 102 by transmission line 116.

Signal processor 102 generates a chip sequence that is used to modulate the transmission waveform. The transmission waveform can be modulated in amplitude or frequency. The chip sequence in the preferred embodiment is a pseudorandom sequence. Pseudorandom sequences typically exhibit statistical randomness while being generated by an entirely deterministic causal process. In the preferred embodiment, the generated pseudorandom sequence is a series of 1s and 0s in length sufficient to encode the transmitted waveform. The length of a chip sequence is determined by the size of the environment being transmitted into or in industrial applications, the size of the tank being measured. Typically, the chip sequence length is about $2^{20}$ bits, but can vary. Signal processor 102 also generates a replica of the chip sequence with a controlled delay. For most applications, a controlled delay of between 0.01 microseconds and 1 millisecond is sufficient. Signal processor 102 also modifies the replica to account for response functions. Both receive transducer 108 and transmit transducer 106 have response functions known in the art. The material and the tank in which the signal is transmitted also have response functions that can be determined as known in the art. The response functions are measures of the imperfections added to the sent or received signal, respectively, added by the physical components of the system or the media and containers in which the transmitted signal is placed. For "off the shelf" components, the response functions are supplied by the manufacturer. For custom built components and for transmission, testing input and output signals as known in the art is used to determine the response functions.

Transmit transducer 106 introduces the modulated transmitted signal 112 into the medium of transmission 109. The transmitted signal can be transmitted at low radio frequencies in the range of 3 to 3000 Hz or in the ultrasonic range of 20 kHz to 1 MHz. In the case of ultrasonic detection of tank levels the transmission medium is usually air. Transmit transducer 106 is located in tank 104 and is aimed at material surface 105 in tank 104. Transmitted signal 112 is reflected from material surface 105. Reflected signal 114 is received by receive transducer 108. Receive transducer 108 then converts the received signal into electrical impulses and sends them back to the signal processor. The received signal is then processed by signal processor 102 to determine the level of material in tank 104.

Figure 2:
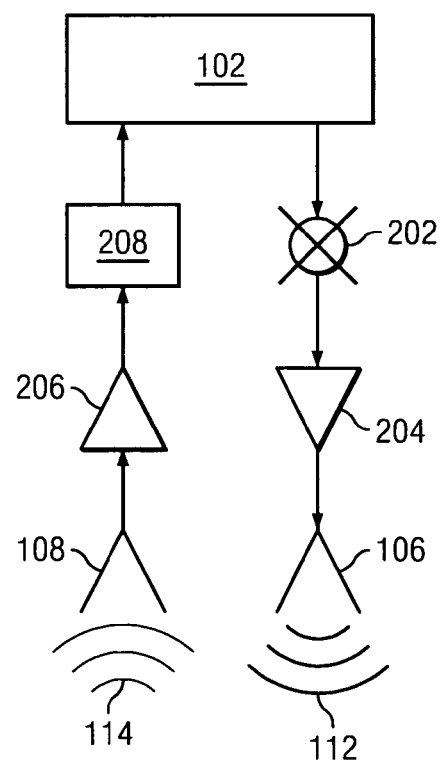
FIG. 2 is a schematic diagram of the preferred embodiment of the invention.

FIG. 2 shows a schematic view of the physical components of a preferred embodiment of the invention. Those skilled in the art will be familiar with the components and of variations in the components that can be made to adapt the invention to various uses. Signal processor 102 generates an electrical signal which is modulated with the chip sequence by modulator 202. The modulated signal is then amplified by transmit amplifier 204 and passed to transmit transducer 106 which converts the electric signal to transmitted signal 112 and introduces it to the environment. Receive transducer 108 receives reflected signal 114 from the material and other obstructions in the tank and converts it back to an electric signal to be amplified by receive amplifier 206. The electric signal is then converted from an analog signal to a digital sequence by A/D converter 208 before passing the sequence on to signal processor 102 where the sequence is stored in an array.

Figure 3:
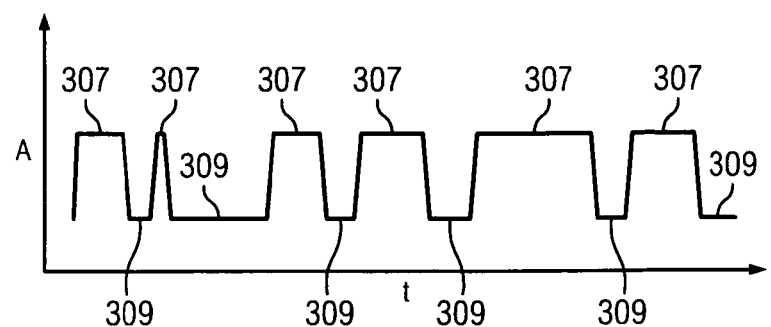
FIG. 3 is a graphical depiction of a modulated transmitted direct sequence spread spectrum signal showing amplitude versus time.

FIG. 3 is a graphical depiction of an example of a modulated transmitted direct sequence spread spectrum signal showing amplitude of the signal over time. Peaks 307 and valleys 309 indicate the pattern of the chip sequence modulated onto transmitted signal 112.

Reflected signal 114 may be processed in real time or alternatively may be digitally recorded for processing after the transmit/receive cycle is complete. Signal processor 102 records the returning signal immediately after the transmitted signal 112 is sent and for a length of time thereafter sufficient to ensure that all reflections from objects in tank 104 have enough time to reach receive transducer 108 after transmitted signal 112 has ended.

Transmitted signal 112 travels at a finite speed after it leaves transmit transducer 106; reflects from targets and travels back to receive transducer 108. During flight, the signal is reflected from objects in the tank and the surface of the material to be measured. Reflected signal 114 will contain many replicas of the transmitted chip sequence for each object from which it has been reflected and delayed in time according to the distance of the object from the transmitter. There are typically many objects which serve to reflect the signal in a tank. Reflected signal 114 is a sum of reflections of the transmitted sequence along with noise. Each echo sequence received has different amplitude according to reflectivity of the object and the different time delays.

Figure 4:
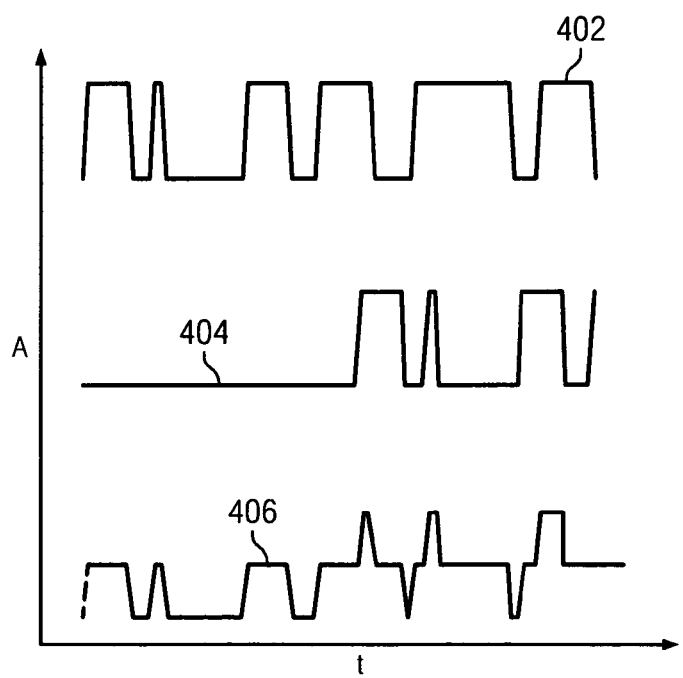
FIG. 4 is a graphical depiction of a received signal from the material, a received signal from an obstruction, and the sum of the two.

FIG. 4 shows a graphical depiction of an example of reflected signal 114 received by receive transducer 108 on an amplitude (A) versus time (t) plot. Wave form 402 depicts the amplitude and time delay of a transmitted signal reflected from an obstruction close to the transmitter. Wave form 404 depicts the amplitude and time delay of the same transmitted signal. It is noted that the two reflected signals 402 and 404 are the same but are shifted in phase. Wave form 406 is a graphical depiction of the sum of wave form 402 and wave form 404. It is noted that superposition of the two signals occurs and results in the summing of the two wave forms.

Figure 5:
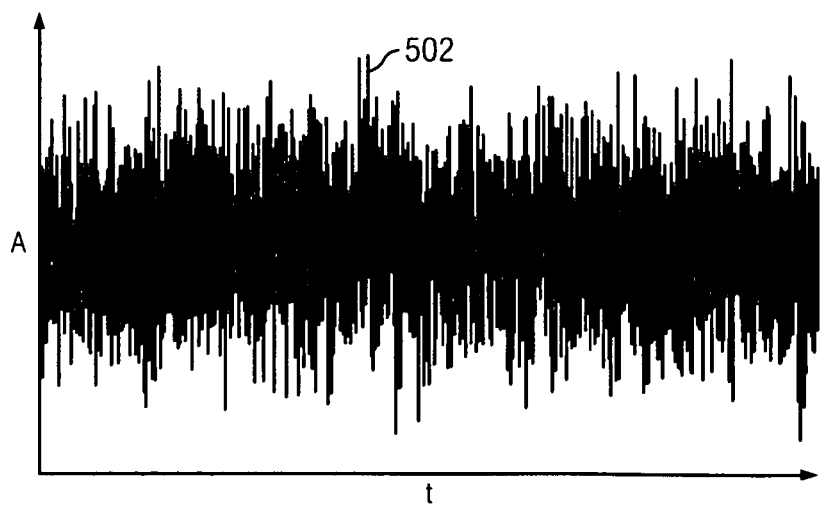
FIG. 5 is a graphical depiction of a received unprocessed direct sequence spread spectrum signal containing range information and noise.

FIG. 5 is a graphical depiction of the amplitude versus time of an actual received unprocessed DSSS signal containing the superposition of many reflected signals from many objects in a tank and from the material as well as noise. Due to superposition, the received dataset is a sum of many phase shifted versions of the transmitted signal.

Signal processor 102 arranges the data representing the reflected wave form so that the data that has zero phase shift is leftmost in the dataset. Signal processor 102 is programmed to implement a cross correlation function to determine the phase shift and amplitude of the individual copies of the chip sequence in reflected signal 114. The basis of the signal processing carried out by the preferred embodiment of the invention is the cross correlation function where $f_{(x)}$ and $g_{(x)}$ are the continuous functions being compared, $\tau$ is the phase delay and t is time.

$$\int_{t1}^{t2} \overline{f}(-\tau)g(t-\tau)\delta\tau = \text{correlation value(or quality of fit)}$$

The cross correlation function is generally a measure of the "similarity" of two signals commonly used to find features in an unknown signal by comparing it to a known one. In this embodiment, the first signal compared is a replica of the transmitted signal which has been generated and stored by the signal processor. The second signal is the received signal containing range information and noise received from the receive transceiver. The two signals are cross correlated. During the cross correlation, the processor assigns a correlation value to how well the two sequences match at each phase shift.

FIG. 6 is a depiction of an example of how the cross correlation function compares two signals in the preferred embodiment. In practice, the length of the transmitted sequence is determined by the environment to be measured and can range from $2^{10}$ to $2^{30}$ bits in length. The length of the received sequence is approximately the same length as the transmitted sequence. However, when cross correlating the two sequences, data at the end of the received sequence is not analyzed. During the cross correlation operation, the transmitted sequence is shifted through a number of phase shifts to calculate the similarities at each phase shift. In order to keep the number of bits cross correlated at each iteration constant, the received sequence is truncated an amount of bits. The amount of bits of the received sequence not analyzed corresponds to how many times the transmitted sequence is shifted during cross correlation. The amount of data not analyzed can vary; however, the length of the data not analyzed should be as short as possible to maintain accuracy and precision in the cross correlation result. To ensure that echoes from the bottom of the tank are analyzed during the cross correlation process, the smallest amount of data not analyzed is equal to the length of the measurement environment. The length of the measurement environment in feet or meters is converted to bits by dividing the length of the measurement environment by the speed of sound in the measurement environment and multiplying with the bit rate of the transmit transducer. A transmission in air (speed of sound equal to 1129 ft/sec) using a typical ultrasonic frequency of 40 kHz in a tank height of 50 feet results in a bit length of 1770 bits. Further, a transmission in water (speed of sound equal to 4923 ft/sec) using a transmission frequency of 1 MHz for a 10 foot measurement range results in a bit length of 2030 bits.

In the example of FIG. 6, the known signal is transmitted sequence 602 and the unknown signal with features to be found is received sequence 604. Transmitted sequence 602 has a length of 12 bits. In this example, the length of data not analyzed is 4 bits as shown at 642 resulting in a received sequence length of 8 bits to be cross correlated shown at 640. In practice, the typical amount of data not analyzed is in the range of 0.001 to 0.005 of the transmitted sequence.

A replica of transmitted sequence 602 is stored in memory by the signal processor as a bit string of 1s and 0s. Received sequence 604 after being converted from an analog signal to a digital signal is stored in memory by the signal processor in its digital format. To utilize the cross correlation function, the transmitted sequence 602 is normalized to 1s and (−1)s, 606. The signal processor normalizes the bit string by assigning a value of 1 for every 1 in the bit string and a value of −1 for every 0 in the bit string. Truncated received sequence 608 is received sequence 604 shortened by 4 bits shown at 642.

The signal processor then begins the comparison of normalized transmitted sequence 606 to truncated received sequence 608 by multiplying the numbers in the corresponding bit positions of each sequence. The value in bit position 1 of normalized transmitted sequence 606 is multiplied with the value in bit position 1 of truncated received sequence 608 and the product is stored. The value in bit position 2 of normalized transmitted sequence 606 is multiplied with the value in bit position 2 of truncated received sequence 608 and the product is stored, and so on. The results of each multiplication are shown in first result 620. After multiplying the values of the corresponding bit positions of the two sequences, the stored products are summed across the bit positions to calculate the correlation amplitude value between those two signals at zero phase shift. This first correlation amplitude value is shown at 630. Correlation amplitude value 630 is a "quality of fit" between the zero phase shifted transmitted sequence and the truncated received sequence.

To calculate the next correlation value, the signal processor shifts normalized transmitted sequence 606 one phase shift shown as normalized transmitted sequence with phase shift 610. In this example a phase shift is equal to one bit. In practice, any size phase shift can be used. The larger the phase shift relative to the length of the transmitted sequence, the less accurate the resulting correlation values will be. The trade off is time. A larger phase shift will result in a faster computation, but a less precise result. Normalized transmitted sequence with phase shift 610 shows normalized transmitted sequence 606 shifted in time (or phase) by one bit.

The value in the first bit position of transmitted sequence with phase shift 610 is now the value that was previously in the second bit position of normalized transmitted sequence 606 and so on. The value in the first bit position of transmitted sequence with phase shift 610 is then multiplied with the value in the first bit position of truncated received sequence 608. The result is then placed in the first bit position of second result 622. The value in the second bit position of transmitted sequence with phase shift 610 is multiplied with the value in the second bit position of truncated received sequence 608 and the product is placed in the second bit position of second result 622 and so on. Second correlation amplitude value 632 is then calculated by summing across the bit positions of second result 622. Second correlation amplitude value 632 is a "quality of fit" between the once phase shifted transmitted sequence and the truncated received sequence.

To calculate the next correlation value, the signal processor shifts normalized transmitted sequence with phase shift 610 an additional phase shown as normalized transmitted sequence with two phase shifts 612. The value that was previously in the second bit position of normalized transmitted sequence with phase shift 610 is now in the first bit position of transmitted sequence with two phase shifts 612. The value in the first bit position of transmitted sequence with two phase shifts 612 is multiplied with the value in the first bit position of truncated received sequence 608. The result is placed in the first bit position of third result 624. The value in the second bit position of transmitted sequence with two phase shifts 612 is multiplied with the value in the second bit position of truncated received sequence 608 and the product is placed in the second bit position of third result 624. Summing the products across the bit positions of third result 624 results in third correlation amplitude value 634. Third correlation amplitude value 634 is a "quality of fit" between the twice phase shifted transmitted sequence and the truncated received sequence.

The process of advancing the phase shift in the transmitted sequence by a single bit each time, multiplying the corresponding values in the bit positions of the phase shifted transmitted sequence and the received sequence, and summing across all the values of the bit positions of the result is repeated through the length of the truncated received sequence one phase shift at a time. In this example each phase shift is equal to one bit. In practice, the trade off of time versus accuracy determines the length of a phase shift. The highest correlation value determined by the cross correlation function identifies the amplitude and phase shift of the strongest echo in the received sequence.

Figure 7:
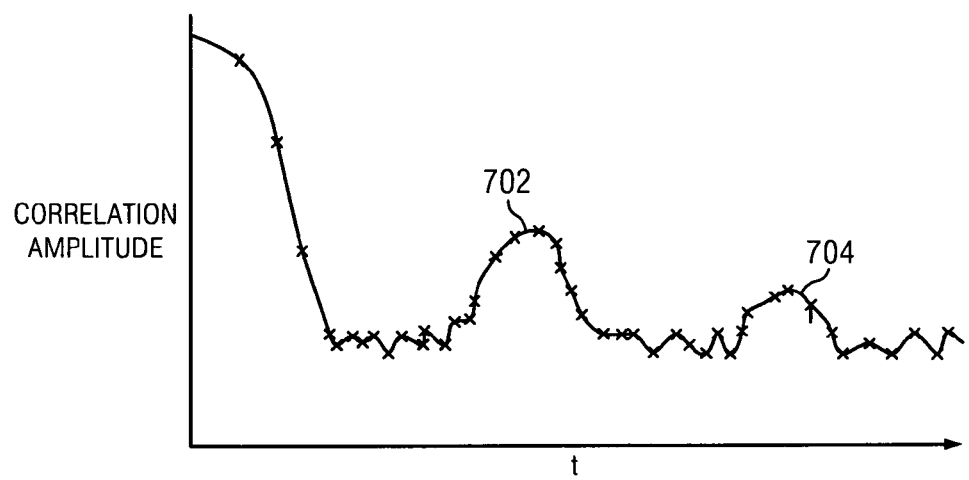
FIG. 7 is a graphical depiction of an example of the output of a cross correlation function used in one embodiment of the invention.

FIG. 7 shows an example of a plot of the correlation amplitude values resulting from the process described above where the x-axis is time or phase shift and the y-axis is correlation amplitude. Each point on the plot corresponds to an "echo sequence" returning from the tank at that particular phase shift. The "echo sequence" is the original chip sequence normalized to 1s and (−1)s delayed by the phase shift and multiplied by the normalized correlation value. The normalized correlation value is defined as the correlation value divided by the chip sequence length. The normalized correlation value is equal to the amplitude per bit.

In this example, two "peaks" are shown. A tall peak relative to other peaks indicates a strong match to the transmitted signal at that particular phase shift. First correlation peak 702 and second correlation peak 704 represent phase shifts, or distances, where the transmitted pattern matches strongly, and therefore represent strong echoes from targets in the tank.

The plot of the correlation amplitude values will indicate a strong correlation peak for a received sequence containing a single reflection, but there will also be smaller peaks. The smaller peaks represent partial correlations and are known as the "side lobes" of an echo sequence. The side lobes from strong echo reflections mask smaller echoes in the same measurement cycle. Masking limits the range of the largest echo to the smallest echo that system is capable of measuring. The range defined by masking is known as the dynamic range of the system. "Masking" is also known as side lobe interference to those skilled in the art.

The invention reduces masking or side lobe interference by the echo subtraction technique disclosed. The natural result is an increase in the dynamic range of the system by over 50 dB.

Figure 8:
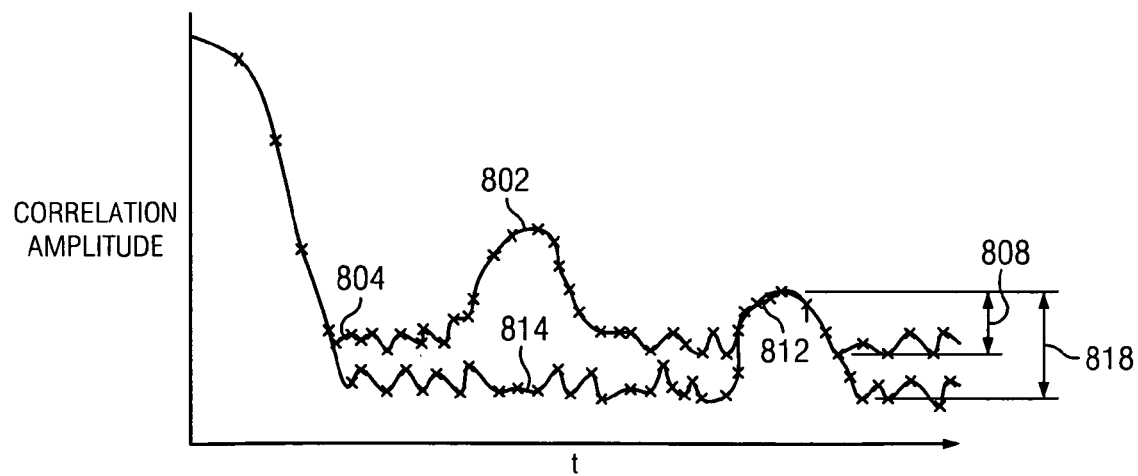
FIG. 8 is a graphical depiction of an example of "echo subtraction" used in one embodiment of the invention.

FIG. 8 shows a graphical interpretation of the results of the echo removal process indicating an increase in the signal to noise ratio of the remaining echo in a correlation amplitude versus time plot. Largest correlation peak 802 of first correlation plot 804 identifies the phase shift and the correlation amplitude used to create the echo sequence that corresponds to the strongest echo from a target in the tank. Signal processor 102 creates an echo sequence representing the strongest echo by delaying the original transmitted sequence by the identified phase shift and multiplying the original transmitted sequence by a normalized correlation amplitude value. After the echo sequence corresponding to largest correlation peak 802 is created, signal processor 102 then subtracts the echo sequence from the stored dataset corresponding to the received sequence. The removal of the echo sequence from the received sequence also removes its masking effect of other echoes.

Signal processor 102 then cross correlates again the replica of the transmitted sequence with the stored data representing the received sequence (minus the echo sequence corresponding to the largest correlation peak 802). Second correlation plot 814 represents the output of this second cross correlation. A second correlation peak 812 is shown. Before the echo sequence corresponding to largest correlation peak 802 is removed, correlation peak 812 has SNR 808. After the echo sequence corresponding to largest correlation peak 802 is removed, correlation peak 812 has SNR 818. It is noted that SNR 818 is higher than SNR 812. The process is repeated where the amplitude and phase shift of each correlation peak is identified and used to create an echo sequence corresponding to it. That echo sequence is then subtracted from a stored dataset that already has the echo sequence corresponding to the previous correlation peak removed. The subtracted echo sequence is used to assemble a high dynamic range echo profile. A correlation plot is derived at each full iteration of the cross correlation function. Each resulting correlation plot identifies the phase shift and correlation amplitude that is used to create the next echo sequence corresponding to the next strongest echo from a target. This process is repeated until the desired dynamic range is reached, or until there are no more echoes to be found, or until the noise floor is reached. The echo sequences created from the identified correlation peaks should be created and removed in highest to lowest amplitude order for best SNR in the finished echo profile.

FIGS. 13a and 13b show an example of code used to perform the echo subtraction process. The programming language used in this example is MATLAB. MATLAB is a numerical computing environment and programming language available from The Mathworks, Inc. of Boston, Mass. The signal processor included in the present invention may use any suitable programming language. In this example, an artificial transmitted sequence (ds) and an artificial received sequence (rx) are created and used to demonstrate the echo subtraction process. In practice, the transmitted sequence is generated by the signal processor and the received sequence is reflected from targets in the measurement environment and received by the receive transducer.

Block 1302 sets the values for parameters used in the sequence generation steps. For this example, the length of the maximal length direct sequence is 1,024 bits. The entire transmitted sequence (ds) is the 1,024 bit sequence repeated 20 times. The variable (dsL) is set to 20 to accomplish this. The variable (AL) is the length of the echo profile also known as the length of the environment to be measured and it is set to 100.

Blocks 1304, 1306, and 1308 show the steps involved in creating transmitted sequence (ds).

Block 1304 shows the steps involved in generating the maximal length direct sequence, in this case a 1,024 bit sequence. The maximal length direct sequence is a deterministic sequence of 1s and 0s. An array, (dsref 10b) is defined as 1,024 rows and one column and populated with all zeros. Next a random sequence of ten variables each valued at 1 or 0 is defined and the entire (dsref 10b) array is populated using an exclusive-or function in a for loop to create a deterministic direct sequence.

Block 1306 shows the code where the array (dsref10b) is normalized from 1s and 0s to is and (−1)s. The 1s and (−1)s are used in the cross correlation step of block 1320.

Block 1308 shows the generation of the transmitted sequence (ds). An array (ds) is defined as having 1,024 times the variable (dsL) rows and one column and populated with all zeros. This corresponds to the transmitted sequence (ds) being twenty times the length of the maximal length direct sequence. In other words, the transmitted sequence (ds) is the array (dsref10b) repeated twenty times. The nested for loops in block 1308 populate the array (ds) with the values from the array (dsref10b).

The generation of the received sequence (rx) is shown in blocks 1310, 1312, 1314, and 1316.

The variable (AL) is set to 100, therefore block 1310 defines the amplitude array (A) as 100 rows and one column populated with all zeros. Block 1310 then populates the amplitude array (A) with values that represent a graph of exponential decay.

Block 1312 adds an artificial echo profile to the amplitude array (A). A large peak of 5000 is added at the time shifts of 41 to 50. This echo profile or peak in the graph represents a reflection in the received sequence from a target in the measurement environment.

The received sequence array (rx) is defined in block 1314. The received sequence (rx) is an array the same dimensions as the transmitted sequence array (ds). Received sequence array (rx) is defined as having 1,024 times the variable (dsL) rows and one column and populated with all zeros. The nested for loops in block 1314 populate the received sequence array (rx) using the values from the amplitude array (A) and the transmitted sequence array (ds). Received sequence array (rx) is populated by multiplying each phase shift of (ds) by the amplitudes of the amplitude array (A).

In block 1316, noise is added to the received sequence array (rx). The noise is added to more accurately depict what the received sequence would look like. A two dimensional noise array (noise) is populated by a wgn function representing white Gaussian noise. Gaussian white noise is a good approximation of many real-world situations and generates mathematically tractable models. To complete the received sequence array (rx), values from the noise array (noise) are multiplied by 50,000 and added to the received sequence array (rx).

Once the example transmitted sequence (ds) and example received sequence (rx) have been created, blocks 1318, 1320, and 1322 cross correlate the two signals, detect and create the echo sequence corresponding to the strongest echo in the received sequence, and remove the detected echo sequence from the received sequence to increase the signal to noise ratio of the echo sequence corresponding to the next strongest echo in the received sequence.

Block 1318 defines a correlation array (decoderx) having 100 columns and one row and populated with all zeros. The correlation array (decoderx) holds the correlation values calculated at each phase shift.

Block 1320 calculates the correlation value between received signal (rx) and transmitted signal (ds) at each phase shift by multiplying the values in the bit positions and adding their product to the variable (rec). After all bit positions are analyzed, the counter (i) increments representing a phase shift and the correlation begins again. In this example there are 100 phase shifts to increment. The correlation array (decoderx) is populated using the values of (rec) and is used to identify the highest value of (rec).

Block 1322 performs the echo subtraction process. The previously identified highest value of (rec) represents a peak in the correlation value graph used to create an echo sequence that corresponds to the strongest echo in the received sequence. The (rec) value identifies the amplitude and the phase shift of that echo sequence. To create the echo sequence corresponding to the strongest echo so that it may be subtracted from the received sequence, the transmitted sequence is time shifted by the identified phase shift and multiplied by the identified amplitude. Line 105 in block 1322 creates and subtracts the echo sequence corresponding to the strongest echo in the received sequence from the received sequence. The amplitude of the (rec) value is normalized by dividing it by the length of the transmitted sequence minus the length of the measurement environment shown at 1324. In this example, the values used to normalize the amplitude of the (rec) value are all variables that have been hard coded. In practice, the length of the transmitted sequence generated by the processor is known as well as the length of the measurement environment. The normalized amplitude is multiplied with the phase shifted transmitted sequence (ds) shown at 1326 to create the echo sequence. The echo sequence corresponding to the strongest echo in the received sequence is removed from the received sequence (rx) by the subtraction function shown at 1328. The for loops of blocks 1320 and 1322 repeat the process until there are no more echo sequences to subtract.

The series of echo sequences thus identified and subtracted are used to build an echo profile. The signal processor uses Digital Signal Processing (DSP) known in the art to calculate the desired target range information from the high SNR echo sequences assembled in the echo profile. The highest amplitude echo sequence in the echo profile occurs at an identified phase delay and represents a target. The range to the target is calculated by multiplying the phase delay in time units by the speed of sound of the environment. The result is the desired range measurement.

The process of echo subtraction increases the dynamic range of the system by always subtracting out the identified next strongest echo and its associated side lobe interference. Without the side lobe interference of the previous strongest echo, the subsequent next strongest echo has a higher SNR, which translates into higher dynamic range. The increase in the dynamic range of the system effectively decreases the "blind area" associated with prior art pulse echo ranging systems from several centimeters to around 5 millimeters. The decrease in "blind area" increases efficiency of the storage tank.

The transmitted DSSS signals of the present embodiment by nature are relatively long and of a lower peak power compared to the very short, high power pulses of the prior art. The length of the chip sequence and thus the time duration of the transmitted signal is determined by the size of the environment to be measured and the material being measured. A longer vessel will require a longer chip sequence because the distance that the transmitted signal travels is longer. For example, a tank approximately 50 feet tall will require a chip sequence of around $2 \times 10^{20}$ to $2 \times 10^{22}$ bits. A longer tank such as a tank of approximately 150 feet can require a chip sequence of up to $2 \times 10^{24}$ bits. A material with high dust content will require a longer chip sequence to ensure better dust penetration. For example, in a dusty environment like a wheat storage tank, chip sets as long as $2 \times 10^{28}$ bits to $2 \times 10^{30}$ bits may be required.

The higher dynamic range of the system and the lower peak power output requirement allows the system to utilize a smaller, less bulky and less expensive transducer designed to handle only modest power levels but still yield the same or higher average power output. The actual power outputs vary for each situation, but a DSSS level measuring system utilizes peak power outputs on the order of 1000 times less than traditional pulse echo ranging systems. For a typical application in a grain tank of 100 feet, peak energy output levels can range from 0.01 to 10 Joules. Therefore, the transducers needed for a system as described will require smaller peak energies than those corresponding systems in the prior art.

Figure 9:
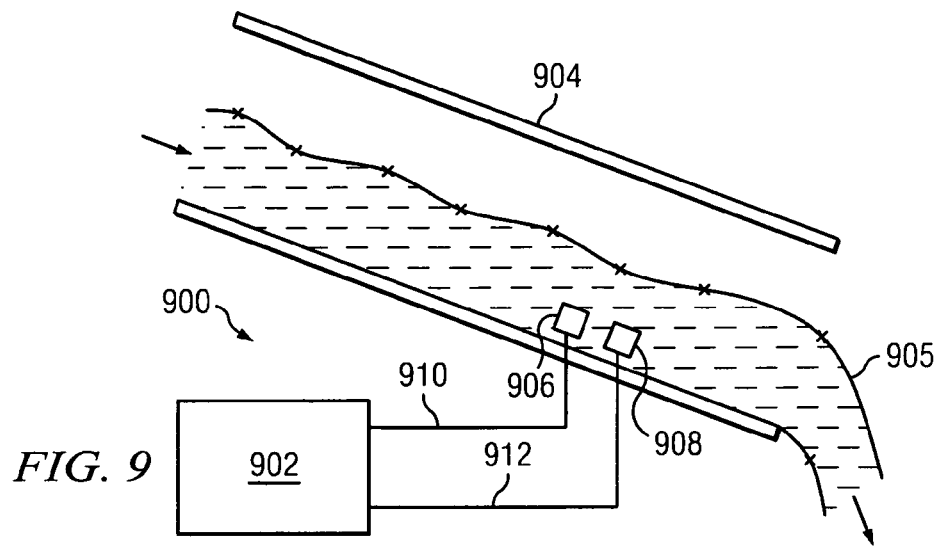
FIG. 9 is a schematic diagram of a ranging Doppler flow measurement system.

FIG. 9 shows one embodiment of the present invention being used as direct sequence ranging Doppler flow measurement system 900. Direct sequence ranging Doppler flow measurement system 900 is comprised of signal processor 902 connected to transmit transducer 906 through transmission line 910 and connected to receive transducer 908 through transmission line 912. Transmit transducer 906 is located in material 905 and transmits a waveform generated by signal processor 902 into material 905.

Signal processor 902 generates a transmit waveform that is converted to sound by transmit transducer 906 and directed into the medium of transmission. The medium of transmission in one example may be water. The transmitted signal is reflected from bubbles, suspended particles, or vortices in the flow stream of material 905. The reflected signal, along with other signals such as noise and interference, is received by receive transducer 908 which then converts the received signal into electrical impulses. The electrical signal produced by receive transducer 908 representing the returned signal from material 905 in conduit 904 is processed by signal processor 902 to determine the flow profile of material 905. The flow profile includes the velocity and level of material 905 flowing through conduit 904.

The preferred embodiment of a direct sequence echo ranging Doppler flow measurement system has the same physical components as shown in FIG. 2. Referring to FIG. 9 by analogy, signal processor 902 generates an electrical signal which is modulated with the chip sequence by a modulator. The chip sequence can range from about $2 \times 10^{10}$ bits up to about $2 \times 10^{24}$ bits depending on the density of the fluid being measured, its flow rate, the density of the suspended particles or bubbles and the size of the conduit carrying the fluid. The modulated signal is then amplified by a transmit amplifier and passed to transmit transducer 906 which converts the electric signal to transmitted waveform and introduces it to the environment.

Typical transducer peak energy ranges are from about 0.01 Joules to about 10 Joules depending on the density of the fluid, the flow rate of the fluid, the density of the suspended particles and the size of the fluid conduit. In some cases, turbulence as opposed to laminar flow of the fluid may also affect the power requirements of the system.

Receive transducer 908 receives the reflected signal from bubbles and other floating particles in material 905 and converts it back to an electric signal to be amplified by a receive amplifier. The electric signal is then converted from an analog signal to a digital sequence by an A/D converter before passing the signal on to signal processor 902 where the sequence is stored in an array in memory. Alternatively, the received signal is processed in real time.

Signal processor 902 records the received electrical sequence during the time the physical signal is sent and for a long enough time to ensure that all reflections from objects in conduit 904 have enough time to reach receive transducer 908 after the transmit signal has ended. Signal processor 902 processes the recorded received electrical sequence using a two dimensional correlation function to separate target echoes from the noise and other target echoes. The additional dimension is required to account for the velocity of the moving fluid.

The received signal is a sum of reflections of the transmitted sequence along with noise. Transmitted signals travel at a finite speed after leaving transmit transducer 906, reflect from obstructions in the moving fluid, and then travel back to receive transducer 908. Obstructions in this context can be bubbles, suspended particles, density variation, boundaries between turbulent and laminar barriers, and pronounced temperature differences. The received signal will contain replicas of the transmitted chip sequence, but delayed in time according to how far the obstructions were for that particular reflection and shifted in frequency according to the velocity of the reflecting obstruction relative to receive transducer 908. There are typically many obstructions in a flow stream, and therefore are many copies of the chip sequence are included in the received signal. Each chip sequence received has different amplitude according to obstruction reflectivity, different time delays according to the distance that the obstruction is from the receive transducer, and different Doppler shifts according to obstruction velocity relative to receive transducer 908.

The correlation function used as a pattern matching tool for Doppler velocity determination adds a frequency shift analysis. A two dimensional cross correlation function used by ranging Doppler flow measurement system 900 is shown below where $\tau$ is amplitude, t is time, and v is velocity.

$$\int_{t1}^{t2}\int_{v1}^{v2} \overline{f}(-\tau, -v')g(t-\tau, v-v')\delta\tau\delta v =$$

correlation value (or quality of fit)

Processing of the signals in a ranging Doppler flow measurement system consists of the ranging determination and the Doppler velocity determination. In the present invention, the received sequence is cross correlated with a replica of the transmitted sequence first at each phase shift and then at each frequency shift. The replica of the transmitted sequence is modified according to the response functions of the system.

The cross correlation function compares the replica of the transmitted sequence with zero phase shift and zero Doppler shift to the received sequence and determines how well the signals match. The cross correlation function outputs a "quality of fit" correlation amplitude value that represents how well the received data correlates with the transmitted sequence at zero phase shift and zero Doppler shift. A new "quality of fit" correlation amplitude value is calculated after the transmitted sequence is phase shifted to the next step out of phase. This second "quality of fit" number is associated with the new phase shift. The process is repeated for each phase shift while maintaining the zero Doppler frequency shift. To complete the quality of fit calculation using the two dimensional correlation function, the Doppler frequency shift is addressed. The complete correlation process for each phase shift is repeated for each Doppler frequency increment.

Figure 10:
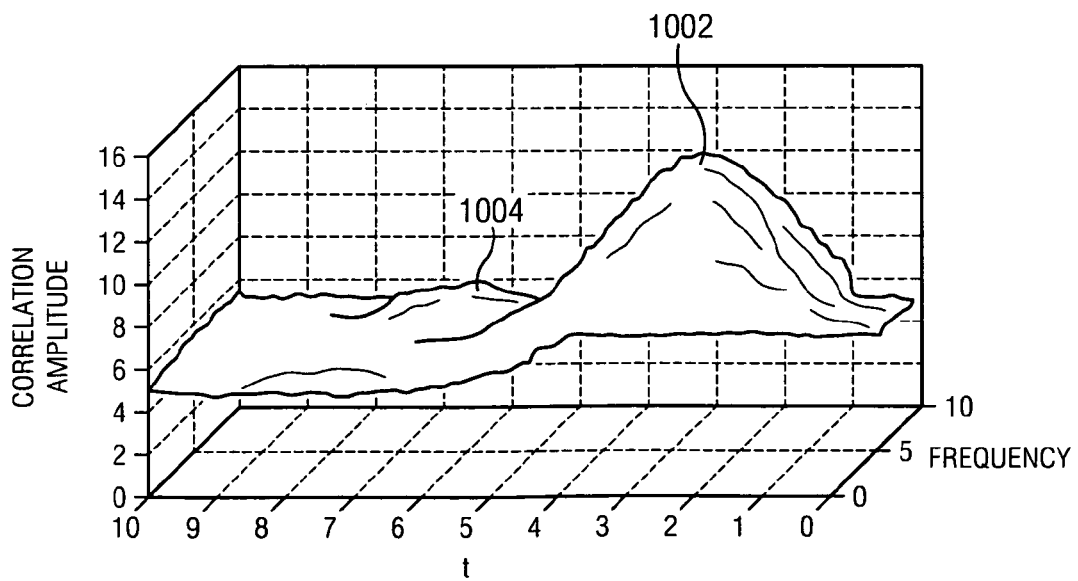
FIG. 10 is an example of a three-dimensional graphical depiction of the output of a cross correlation function showing two echoes, two Doppler shifts and noise.

FIG. 10 is a three-dimensional graphical depiction of the output of the cross correlation function showing two peaks in the quality of fit plot. The three axes of the graph are time, frequency, and correlation amplitude. Each point on the plot corresponds to an echo sequence returning from the conduit. A tall peak relative to other peaks indicates a strong match between the received sequence and the transmitted sequence at that particular phase shift and frequency shift. First correlation peak 1002 and second correlation peak 1004 are strong matches between the received sequence and the transmitted sequence and indicate echoes from obstructions in the flow. The entire dataset making up the output of the cross correlation function is stored by signal processor 902. Alternatively, calculations may be made in real time.

Figure 11A:
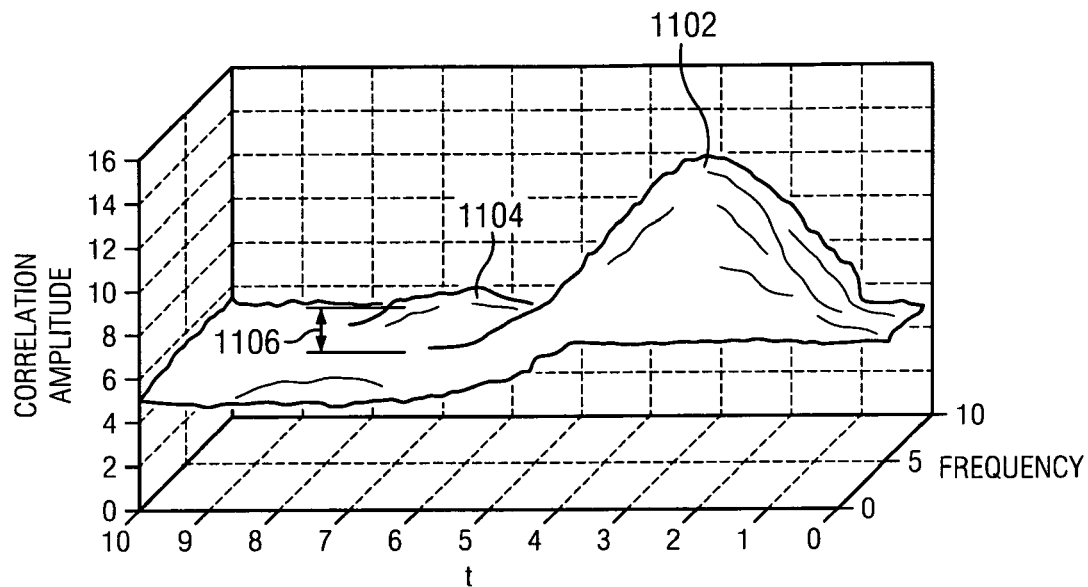
FIG. 11A is an example of a three-dimensional graphical depiction showing two peaks and the signal to noise ratio of the smaller peak before echo subtraction
Figure 11B:
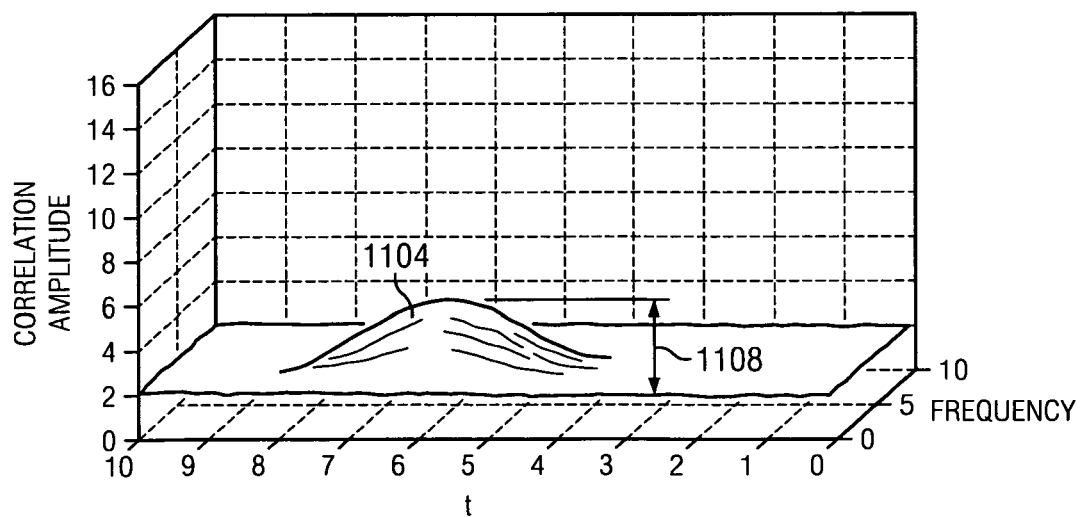
FIG. 11B is an example of a three-dimensional graphical depiction showing one peak and its signal to noise ratio after echo subtraction.

FIGS. 11A and 11B show a graphical interpretation of the results of the echo removal process in a correlation amplitude versus time versus frequency plot. Largest correlation peak 1102 identifies the phase shift, correlation amplitude, and the frequency shift used to create the echo sequence that corresponds to the strongest echo from an obstruction in the conduit. Signal processor 902 creates an echo sequence representing the strongest echo by time scaling the transmitted sequence by the identified frequency, delaying the transmitted sequence by the identified phase shift, and multiplying the transmitted sequence by the identified amplitude corrected for error. Once the echo sequence corresponding to largest correlation peak 1102 is created, signal processor 902 then subtracts the echo sequence from the stored dataset corresponding to the received sequence. The removal of the echo sequence from the stored dataset prevents it from masking smaller echoes. Signal processor 902 then cross correlates a second time the replica of the transmitted sequence with the stored dataset representing the received sequence minus the echo sequence corresponding to the largest correlation peak 1102.

FIG. 11B represents the output of a second cross correlation and shows correlation peak 1104. Before the echo sequence corresponding to largest correlation peak 1102 is removed, correlation peak 1104 has SNR 1106 as shown in FIG. 11A. After the echo sequence corresponding to largest correlation peak 1102 is removed, correlation peak 1104 has greater SNR 1108. The process is repeated where the amplitude, phase shift, and frequency shift of correlation peak 1104 is identified and used to create an echo sequence corresponding to correlation peak 1104. That echo sequence is then subtracted from a stored dataset that already has the echo sequence corresponding to largest correlation peak 1102 removed. Each identified and removed echo sequence is used to compile a resultant high fidelity echo profile. A three dimensional correlation plot is derived from each iteration of the cross correlation function. This process is repeated until the desired dynamic range is reached, or until there are no more echoes to be found, or until the noise floor is reached. The echo sequences created from the identified correlation peaks should be created and removed in highest to lowest amplitude order for best SNR in the finished echo profile.

FIGS. 14a, 14b, 14c and 14d show an example of computer code used to simulate a direct sequence ranging Doppler measurement system including the echo subtraction process. The code creates artificial transmitted sequences each with different Doppler frequency shifts and also creates an artificial received sequence. In addition to generating an artificial received sequence, the code generates artificial transmitted sequences each with different Doppler frequency shifts and cross correlates each the received sequence. The correlation values are used to identify, create, and then subtract echo sequences from the received sequence. The identified echo sequences are used to build a high fidelity echo profile, which is in turn used to determine range and flow measurements. The programming language used in this example is MAT-LAB. The signal processor included in the present invention may use any suitable programming language.

Block 1402 sets the values for parameters used in the sequence generation steps. For this example, the length of the maximal length direct sequence is 1,024 bits. Each transmitted sequence (ds1, ds2, ds3, ds4, and ds5) is the 1,024 bit sequence repeated 5 times and subsequently repeated 20 times. The variable (dsL) is set to 20 to accomplish this. The variable (AL) is the length of the echo profile also known as the length of the environment to be measured and it is set to 100.

Blocks 1404, 1406, 1408, 1410, and 1412, show the steps involved in creating the artificial transmitted sequences (ds1), (ds2), (ds3), (ds4), and (ds5).

Block 1404 shows the steps involved in generating the maximal length direct sequence. The maximal length direct sequence is a deterministic sequence of 1s and 0s. An array, (dsref10) is defined as 1,024 rows and one column and populated with all zeros. Next a random sequence of ten variables each valued at 1 or 0 is defined and the entire (dsref10) array is populated using an exclusive-or function in a for loop to create a deterministic direct sequence.

Block 1406 shows the code where the array (dsref10) is normalized from 1s and 0s to 1s and (−1)s. The cross correlation function in block 1422 requires the bit string to be in 1s and (−1)s.

An array, (dsref10b) is defined as 5,120 rows and one column and populated with all zeros in block 1408. The array (dsref10b) is populated with the values stored in (dsref10). Ultimately, the array (dsref10b) contains the values of (dsref10) repeated five times.

Block 1410 generates the sequence of length 5,120 bits for each Doppler shift. In this example code, only 5 Doppler shifts are shown. In practice, the received sequence contains multiple Doppler shifts received from many different targets or obstructions in the measurement environment. Block 1410 defines arrays (dsreflong5), (dsreflong4), (dsreflong3), (dsreflong2), and (dsreflong1) as 5,120 rows and one column all populated with zeros. Through a series of differing length for loops, each (dsreflong1) array is populated with the values from array (dsref10b). In this simulation, array (dsreflong5) will be used to generate the transmitted sequence with the lowest frequency and array (dsreflong1) will be used to generate the transmitted sequence with the highest frequency.

To complete the generation of the transmitted sequences, block 1412 defines arrays (ds1), (ds2), (ds3), (ds4), and (ds5) as having 5,120 times (dsL) rows and one column all populated with zeros. Ultimately arrays (ds1), (ds2), (ds3), (ds4), and (ds5) have 102,400 rows and one column. This corresponds to the transmitted sequences being 100 times the length of the maximal length direct sequence (dsref10) generated in block 1404.

In this simulation, each transmitted sequence is an example of a different Doppler frequency shift. (ds1) is the transmitted sequence with a Doppler frequency shift. (ds2) is the transmitted sequence with a Doppler frequency shift two times that of (ds1). (ds3) is the transmitted sequence with a Doppler frequency shift three times that of (ds1) and so forth. In practice, Doppler frequency shifts are not even integers. Even integers are used in this example for clarity. The nested for loops of block 1412 populate arrays (ds1), (ds2), (ds3), (ds4), and (ds5) with the values in the arrays (dsreflong1), (dsreflong2), (dsreflong3), (dsreflong4), and (dsreflong5) respectively.

Blocks 1414, 1416, and 1418 show the steps involved in creating an artificial received sequence (rx). Each transmitted sequence is cross correlated with the received sequence to determine its highest correlation value. The highest correlation value identifies the amplitude, time shift, and frequency shift of a target in the measurement environment. In practice, the one transmitted sequence is generated by the processor and the received sequence including different frequency shifts is reflected from targets in the measurement environment and received by the receive transducer.

The simulated received sequence (rx) is built to include three echoes at three different frequency shifts. In block 1414, the amplitudes (A1), (A2), and (A3) of the simulated echoes in the received sequence are set to three different values. A phase shift (R1), (R2), and (R3), also known as a range, is set at each amplitude respectively. In practice, the received sequence includes many echoes with many amplitudes from different ranges all masked by noise.

The array representing the received sequence (rx) is defined in block 1416. Received sequence array (rx) is defined as having 5,120 times the variable (dsL) rows and one column and populated with all zeros. The for loop in block 1416 populates the received sequence array (rx). Line 147 of block 1416 adds the echo represented by amplitude (A1), phase shift (R1), and the Doppler frequency shift built into (ds1). Line 148 of block 1416 adds the echo represented by amplitude (A2), phase shift (R2), and the Doppler frequency shift built into (ds3). Line 149 of block 1416 adds the echo represented by amplitude (A3), phase shift (R3), and the Doppler frequency shift built into (ds5). Ultimately, the received sequence array (rx) contains the echo sequence created when the transmitted sequence (ds1) is phase shifted by (R1) and multiplied by amplitude (A1). Received sequence array (rx) also contains the transmitted sequence (ds3) phase shifted by (R2) and multiplied by amplitude (A2) and the transmitted sequence (ds5) phase shifted by (R3) and multiplied by amplitude (A3).

An approximation for sample noise is added to the array (rx) in block 1418. Array (noise) is defined as having 5,120 times the variable (dsL) rows and one column and populated with a random number function (randn). The noise is added to more accurately simulate a received signal. In an actual signal, the noise would be included with the received signal. Values from the (noise) array are multiplied by an amplitude of 100 and used to populate and complete the array (rx) representing the received signal.

Blocks 1420, 1422, 1424, and 1426 cross correlate a transmitted sequence with the received sequence, detect and create the echo sequence corresponding to the highest correlation value, remove the detected echo sequence from the received sequence, and store the removed echo sequence in a high fidelity echo profile.

In block 1420 two three dimensional arrays (decoderx) and (resultsrx) are defined and populated with all zeros. The array (decoderx) ultimately holds the correlation values calculated at each phase shift for each Doppler frequency in block 1422. The array (resultsrx) stores the values representing the detected and removed echo sequences. The (resultsrx) array is the high fidelity echo profile from which the target range information is calculated.

Block 1422 defines variables (rec1), (rec2), (rec3), (rec4), and (rec5) and sets their values to zero. Each (rec1), (rec2), (rec3), (rec4), and (rec5) holds the correlation values resulting from the cross correlation of (ds1), (ds2), (ds3), (ds4), and (ds5) with the received sequence (rx) repectively. Block 1422 calculates the correlation amplitude value at each phase shift for each of the transmitted sequences (ds1), (ds2), (ds3), (ds4), and (ds5). Line 172 of block 1422 calculates the correlation value between received signal (rx) and transmitted signal (ds1) at each phase shift by multiplying the values in the bit positions and adding their product to the variable (rec1). After all bit positions are analyzed, the counter (i) increments representing a phase shift and the correlation begins again. Line 173 of block 1422 shows the cross correlation calculation of the received sequence (rx) with the transmitted sequence (ds2) and so forth. The arrays (decoderx1), (decoderx2), (decoderx3), (decoderx4), and (decoderx5) are populated by the values in (rec1), (rec2), (rec3), (rec4), and (rec5) respectively and identify the phase shifts and the correlation amplitudes of the strongest echo sequences in the received sequence during the current cross correlation. In this example, each frequency shifted transmitted sequence (ds1), (ds2), (ds3), (ds4), and (ds5) is cross correlated with the received sequence separately. In practice, the received sequence containing all the echoes and noise is cross correlated with the one transmitted sequence to calculate the correlation value that ultimately is used to create the echo sequence corresponding to the strongest echo in the received sequence.

Block 1424 performs the echo subtraction process. Because the simulated echo sequences in this example are generated mathematically, the highest correlation amplitude value is known. The highest correlation amplitude value is programmed to occur in (ds1) at an amplitude of (A1) and a range of (R1). In practice, the highest correlation amplitude value corresponding to the strongest echo sequence is determined from the cross correlation function and stored. To create the echo sequence representing the strongest echo so that it may be subtracted from the received sequence, the transmitted sequence is frequency shifted by the identified frequency shift, time shifted by the identified phase shift, and multiplied by the identified amplitude.

In this example, line 190 of block 1424 identifies and subtracts the detected echo sequence from the received signal. In this example, the 10.084 value represents the highest correlation amplitude in (rec1). 10.084 is an estimation for value of (A1) set in block 1414. The exact value of (A1)=10 is not used due to the fact it is impossible to receive an exact replica of the transmitted signal due to noise and interference. The strongest echo sequence is detected by multiplying the phase shifted transmitted sequence (ds1(k+R1)) by the identified amplitude (A1) or in this example, 10.084. The detected echo sequence is removed from the received signal (rx) by the subtraction function in line 190 of block 1424.

In block 1426, the array (resultsrx) is populated by the values (decoderx), which correspond to the strongest echo in the received sequence. The values in (resultsrx) represent the frequency, amplitude, and phase shift of the strongest echo sequences from the received signal (rx). (resultsrx) is the high fidelity echo profile used to calculate the ranging and Doppler measurements.

Block 1428 repeats the steps of block 1422. The second time through the steps will detect, record, and remove the next strongest echo sequence. The SNR of the next echo sequence will be higher now that the first echo sequence has been removed from the received sequence dataset. The process of detecting, recording, and removing echoes is continued until the desired number of echoes are found or until the desired SNR is achieved.

The resultant echo profile of compiled identified echo sequences (resultsrx) has a higher dynamic range than the original received sequence dataset used in the first correlation before the echo subtraction process because the side lobe interferences of each echo sequence in the resultant dataset have been removed. Removing the side lobe interferences results in higher SNR for each identified echo sequence. The resultant echo profile of reassembled identified echo sequences is used to calculate the desired distance and velocity information of the flow in the conduit. The signal processor uses Digital Signal Processing (DSP) known in the art to calculate the desired distance and velocity. The highest amplitude echo sequence in the echo profile occurs at an identified phase delay and frequency shift and represents a target. To calculate the desired flow volume from the echo profile, the identified frequency shift (cycles/sec) is multiplied by the speed of sound in the environment (ft/sec) and then divided by the frequency of the transmit transducer (cycles/sec). This calculation results in the velocity of the flow (ft/sec). The cross sectional area of the flow ($ft^2$) is calculated from the known cross sectional area of the conduit ($ft^2$) and the level of the conduit determined by a range meter (ft). Multiplying the velocity of the flow (ft/sec) and the cross sectional area of the flow ($ft^2$) results in the desired flow volume ($ft^3$/sec).

Figure 12:
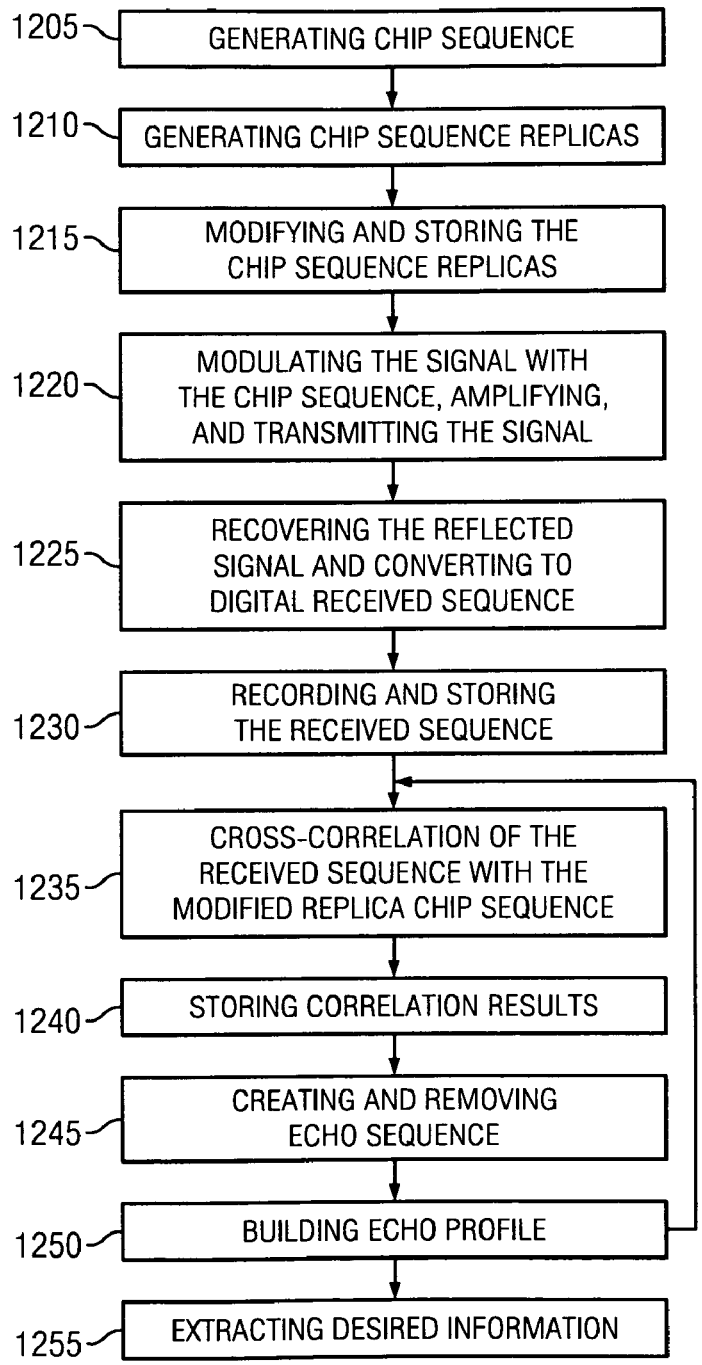
FIG. 12 is a flow chart of the preferred order of execution of the method steps of the preferred embodiment.

As shown in FIG. 12, the preferred embodiment of the present invention includes the following steps that are typically carried out in the signal processor. The same steps are carried out in either the level detection embodiment or the flow measurement embodiment.

Choosing a chip sequence length and generating a chip sequence occurs at step 1205. The chip sequence is the sequence transmitted into the measurement environment. The velocity of the signal through the medium, the dimensions of the tank or conduit, and the length of time available to make the measurement determines the length of signal required to avoid overlap. Overlap is defined as an overlap between the sequences such that echoes cannot be located in phase delay space unambiguously. Sending a longer signal, one that is much longer than the conduit or tank, eliminates this possibility while also lowering the noise floor and increasing sensitivity. The trade off is time. A longer signal is more expensive to send and takes more time and after a certain point, sensitivity ceases to increase. The range of chip sequence lengths typically is between $2 \times 10^{10}$ bits and $2 \times 10^{30}$ bits.

Generating a replica of the chip sequence with a controlled delay and frequency shift an increasing number of steps out of phase occurs at step 1210.

Modifying the replica according to the filter properties of the transmit/receive system so that cross correlation with the received sequence will reveal individual echo sequences and storing the modified replica occurs at step 1215. The signals require modification to compensate for distortion from imperfections in the transducers and transmit media.

At step 1220, modulating, amplifying, and transmitting the signal into the environment occur. The pattern of the chip sequence is modulated by the modulator onto the transmitted signal. The modulated signal is amplified by the transmit amplifier and passed to the transmit transducer which in turn transmits the signal into the environment.

Recovering and recording reflected signals from targets in the environment is done at steps 1225 and 1230. The receive transducer recovers the reflected signal and passes the reflected signal through an amplifier to an A/D converter. The A/D converter converts the signal from analog form to a digital sequence form for the signal processor to record and store.

The signal processor cross correlates the received sequence with the modified replica of the transmitted chip sequence to determine the echo sequence with the largest echo amplitude, its phase delay, and its frequency shift at step 1235. The output of the correlation function is stored in a dataset at step 1240. The signal processor uses the correlation function to first compare the replica of the chip sequence having zero phase delay with the received sequence and calculates a correlation amplitude value. The same calculation is repeated for each phase shift of the replica of the chip sequence. The highest correlation amplitude values correspond to reflected signals from the environment and identify the particular amplitude and phase shift of that reflected signal. For Doppler flow meter applications, the same correlation calculation is additionally repeated for each frequency increment at each phase shift. The highest correlation amplitude values identify the amplitude, phase shift, and frequency shift of the strongest reflected signal.

Creating the echo sequence corresponding to the highest correlation amplitude value and removing the echo sequence from the original received sequence is done at step 1245. The highest correlation amplitude value identifies the amplitude, phase shift, and if measuring velocity, the frequency shift of the echo sequence to be removed. The signal processor creates the echo sequence by delaying the original transmitted sequence by the identified phase shift, multiplying the original transmitted sequence by the identified amplitude, and in flow or velocity applications, time scaling the original transmitted sequence by the identified frequency. The cross correlation function is executed again comparing the transmitted sequence with the received sequence minus the previously identified and removed echo sequence to identify the next highest correlation amplitude value. The signal processor then identifies the echo sequence corresponding to this next highest correlation amplitude value and removes it from the received sequence. The process continues until the desired dynamic range is reached, or until there are no more echoes to be found, or until the noise floor is reached by repeating steps 1235 through 1250.

At step 1250, each removed echo sequence is used to build an echo profile with a higher dynamic range than the original received dataset. The resultant echo profile has a higher dynamic range than the original received signal because after each echo sequence and its associated side lobe interference is removed, the next identified echo sequence has a higher SNR than it did before the previous echo sequence was removed. Therefore, when each subsequent echo sequence is removed from the original received dataset and used to build the resultant echo profile, each echo sequence has a higher SNR in the resultant echo profile than it did in the original received dataset.

The signal processor then extracts the desired "range to target" information in the case of a level meter or in the case of Doppler flow meter extracts the target velocity information at step 1255 as further described in relation to FIGS. 13 and 14.

It will be appreciated by those skilled in the art that the method of using direct sequence spread spectrum signals in conjunction with the disclosed echo subtraction process as related to pulsed time of flight ranging and flow profiling systems can also be implemented in other areas. In addition to the disclosed acoustical application using sound waves, the method disclosed herein can be applied to optical applications using light waves as well.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A computer system for increasing the signal to noise ratio in a calculated model of an incoming signal comprising a signal processor, at least one transmit transducer and at least one receive transducer wherein the signal processor is programmed to perform the steps of:
  a) generating a direct sequence of predetermined length;
  b) normalizing the direct sequence;
  c) generating a transmitted sequence representing the direct sequence one or more times;
  d) transmitting the transmitted sequence from the transmit transducer;
  e) receiving an incoming signal, composed of one or more received echo sequences, from the receive transducer;
  f) cross correlating the incoming signal with the transmitted sequence;
  g) identifying chosen received echo sequence from the one or more received echo sequences, based on a cross correlation value;
  h) deriving a calculated echo sequence corresponding to the chosen received echo sequence;
  i) removing the calculated echo sequence from the incoming signal;
  j) adding the calculated echo sequence to a calculated model; and
  k) repeating f), g), h), i) and j) a predetermined number of times; wherein the calculated model correlates to the incoming signal and has an increased signal to noise ratio.

2. A set of computer executable instructions residing on a computer readable medium, that when executed by a processor identify a set of received echo sequences from an incoming sequence and remove a set of calculated echo sequences to construct a high fidelity echo profile, by performing the steps of:
  a) generating a maximal length direct sequence;
  b) normalizing the maximal length direct sequence;
  c) generating a plurality of transmitted sequences by repeating the maximal length direct sequence a plurality of times;
  d) transmitting the plurality of transmitted sequences by a transmit transducer operating connected to the processor;
  e) receiving the incoming sequence having a plurality of received echo sequences at a plurality of Doppler frequency shifts from a receive transducer operatively coupled to the processor;
  f) cross correlating the incoming sequence with each of the plurality of transmitted sequences;

g) identifying a chosen received echo sequence from the plurality of received echo sequences;
h) deriving a calculated echo sequence, corresponding to the chosen received echo sequence;
i) removing the calculated echo sequence from the incoming sequence;
j) adding the calculated echo sequence to a high fidelity echo profile; and
k) repeating g), h), i), j) and k) until a predetermined dynamic range of the high fidelity echo profile is reached;

wherein the high fidelity echo profile correlates to the incoming sequence and has an increased signal to noise ratio.

3. A set of computer executable instructions residing on a computer readable medium, that when executed by a processor identify received echo sequences from an incoming sequence and remove calculated echo sequences from the incoming sequence to increase signal to noise ratio, by performing the steps of:
a) defining and setting a value for the length of a direct sequence defining and setting a value for the length of a measurement environment;
b) defining a two dimensional maximal length direct sequence array a plurality of times greater in size than the length of the direct sequence and populated with zeros;
c) defining a plurality of variables and populating the plurality of variables with 1s and 0s in a pseudo-random sequence;
d) populating the maximal length direct sequence array with a deterministic sequence of 1s and 0s using an exclusive or function;
e) normalizing the values in the maximal length direct sequence array to 1s and (−1)s;
f) defining a two dimensional transmitted sequence array a plurality of times greater in size than the maximal length direct sequence array and populated with zeros;
g) populating the transmitted sequence array with the deterministic sequence of 1s and (−1)s stored in the maximal length direct sequence array repeated a plurality of times;
h) defining a two dimensional incoming sequence array equal in size to the transmitted sequence array and populated with zeros;
i) populating the incoming sequence array with a digitized incoming signal, composed of a plurality of received echo sequences;
j) defining a two dimensional correlation array populated with zeros;
k) defining a correlation value field with a zero value;
l) cross correlating the incoming sequence array with the transmitted sequence array and populating the correlation value field with correlation values;
m) populating the correlation array with the correlation values from the correlation value field;
n) identifying an amplitude and a phase shift of a first received echo sequence corresponding to the highest correlation value;
o) shifting the transmitted sequence by the identified phase shift;
p) multiplying the phase shifted transmitted sequence with the identified amplitude to create a calculated echo sequence corresponding to the first received echo sequence having the highest correlation value;
q) subtracting the calculated echo sequence corresponding to the highest correlation value from the incoming sequence;
r) populating an echo profile array with values from the correlation array and the calculated echo sequence;
s) repeating k) through r) a plurality of times until a desired signal to noise ratio is achieved; and,
t) creating a high fidelity echo profile from the echo profile array;

wherein the high fidelity echo profile correlates to the incoming sequence and has an increased signal to noise ratio.

4. The set of computer executable instructions of claim 3 that when executed by the processor further normalized the identified amplitude by the length of the direct sequence minus the length of the measurement environment.

5. The set of computer executable instructions of claim 3 that when executed by the processor further identify received echo sequences corresponding to the highest correlation values and remove the calculated echo sequences corresponding to the highest correlation values from highest amplitude to lowest amplitude.

6. A system comprising a signal processor, a transmit transducer, and a receive transducer wherein the system identifies received echo sequences from an incoming signal and removes calculated echo sequences from the incoming signal to build a calculated model of the incoming signal, when the signal processor is programmed to carry out the steps of:
a) defining and setting values for the length of a direct sequence and the length of a measurement environment;
b) defining a two dimensional maximal length direct sequence array a plurality of times greater in size than the length of the direct sequence and populated with zeros;
c) defining a plurality of variables and populating the plurality of variables with 1s and 0s in a random sequence;
d) populating the maximal length direct sequence array with a deterministic sequence of 1s and 0s using an exclusive or function;
e) normalizing the values in the maximal length direct sequence array to 1s and (−1)s;
f) defining a two dimensional reference array a plurality of times greater in size than the maximal length direct sequence array and populated with zeros;
g) populating the reference array with values from the maximal length direct sequence array a plurality of times;
h) defining a plurality of two dimensional holding arrays populated with zeros;
i) populating the plurality of holding arrays with the values from the reference array each a different plurality of times;
j) defining a plurality of two dimensional transmitted sequence arrays populated with zeros;
k) populating the plurality of transmitted sequence arrays with the values from the plurality of holding arrays;
l) defining a two dimensional incoming sequence array populated with zeros;
m) populating the incoming sequence array with a digitized incoming signal, composed of a plurality of received echo sequences;
n) defining a three dimensional correlation array populated with zeros;
o) defining a three dimensional high fidelity echo profile array populated with zeros;
p) defining a plurality of correlation value fields each with a value of zero;
q) cross correlating each of the plurality of transmitted sequence arrays with the incoming sequence array and populating each of the plurality of correlation value fields with correlation values;

r) populating the correlation array with the correlation values from the plurality of correlation value fields;
s) identifying an amplitude, a phase shift, and a frequency shift of a first received echo sequence, of the plurality of received echo sequences, corresponding to the highest correlation value;
t) shifting the transmitted sequence by the identified phase shift and time scaling the transmitted sequence by the identified frequency shift;
u) multiplying the identified phase shifted and time scaled transmitted sequence with the identified amplitude to create a calculated echo sequence corresponding to the highest correlation value;
v) subtracting the calculated echo sequence corresponding to the highest correlation value from the incoming signal;
w) populating the high fidelity echo profile array with values from the correlation array and the calculated echo sequence;
x) repeating p) through w) a plurality of times until a desired signal to noise ratio for the high fidelity echo profile array is achieved;
y) building a calculated model from the high fidelity echo profile array; wherein the calculated model correlates to the incoming signal and has an increased signal to noise ratio.

7. The system of claim 6 where the signal processor is further programmed to carry out the step of adjusting identified amplitude for noise.

8. The system of claim 6 where the signal processor is further programmed to carry out the step of removing the calculated echo sequences corresponding to the highest correlation values from highest amplitude to lowest amplitude.

\* \* \* \* \*